(12) United States Patent
Deng et al.

(10) Patent No.: US 6,906,133 B2
(45) Date of Patent: Jun. 14, 2005

(54) POLYALKYLDIALLYLAMINE-EPIHALOHYDRIN RESINS AS WET STRENGTH ADDITIVES FOR PAPERMAKING AND PROCESS FOR MAKING THE SAME

(75) Inventors: Fang Deng, Ivyland, PA (US); Daniel Yaodong Gan, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 10/336,468

(22) Filed: Jan. 3, 2003

(65) Prior Publication Data
US 2003/0166791 A1 Sep. 4, 2003

Related U.S. Application Data
(60) Provisional application No. 60/346,475, filed on Jan. 7, 2002.

(51) Int. Cl.$^7$ ............... C08G 63/91; C08F 8/02; C08F 26/04
(52) U.S. Cl. ............ 525/54.23; 524/430; 524/435; 525/328.3; 525/359.3
(58) Field of Search ............... 525/328.3, 359.3, 525/54.23; 524/430, 435

(56) References Cited

U.S. PATENT DOCUMENTS

| | | |
|---|---|---|
| 2,926,116 A | 2/1960 | Keim |
| 2,926,154 A | 2/1960 | Keim |
| 3,686,151 A | 8/1972 | Keim |
| 3,700,623 A | 10/1972 | Keim |
| 3,772,076 A | 11/1973 | Keim |
| 3,833,531 A | 9/1974 | Keim |
| 3,996,694 A | 12/1976 | Zinser ............... 46/86 R |
| 4,222,921 A | 9/1980 | Van Eenam |
| 4,233,417 A | 11/1980 | Van Eenam ............... 525/359 |
| 4,298,639 A | 11/1981 | Van Eenam ............... 427/386 |
| 4,298,715 A | 11/1981 | Van Eenam ............... 525/340 |
| 4,340,692 A | 7/1982 | Van Eenam ............... 525/329 |
| 5,017,642 A | 5/1991 | Hasegawa et al. |
| 5,171,795 A | 12/1992 | Miller et al. ............... 525/430 |
| 5,256,727 A | 10/1993 | Dulany et al. ............... 524/608 |
| 5,516,885 A | 5/1996 | Gorzynski et al. ............... 528/482 |
| 6,111,032 A | 8/2000 | Bower ............... 525/430 |
| 6,268,452 B1 | 7/2001 | Kato et al. ............... 526/310 |

FOREIGN PATENT DOCUMENTS

| | | |
|---|---|---|
| WO | WO 92/22601 | 12/1992 |
| WO | WO 00 14124 | 3/2000 |

OTHER PUBLICATIONS

H.H. Espy, "Alkaline–Curing Polymeric Amine –Epichlorohydrin Resins", Wet Strength Resins and Their Applications, L.L. Chan, Ed., TAPPI Press Atlanta GA, pp. 13–44 (1994).

G.B. Butler, Cyclopolymerization and Cyclocopolymerization, pp. 51–69, Marcel Dekker, Inc., New York (1992).

*Primary Examiner*—Ana Woodward
(74) *Attorney, Agent, or Firm*—Robert O'Flynn O'Brien; David Edwards

(57) ABSTRACT

The present invention relates to a process for making polyalkyldiallylamine-epihalohydrin resins, the resultant resins and their uses as wet strength additives for papermaking. These resins are obtained by a two step process, wherein the first step comprises the free radical polymerization or copolymerization of an alkyldiallylamine monomer in its protonated form; and the second step comprises reacting an ADAA polymer or copolymer with epihalohydrin under carefully controlled reaction conditions.

12 Claims, No Drawings

POLYALKYLDIALLYLAMINE-EPIHALOHYDRIN RESINS AS WET STRENGTH ADDITIVES FOR PAPERMAKING AND PROCESS FOR MAKING THE SAME

CROSS REFERENCE TO RELATED APPLICATIONS

This application is related to U.S. Provisional Patent Application Ser. No. 60/346,475, filed Jan. 7, 2002, from which priority is claimed, the foregoing application is herein incorporated by reference.

BACKGROUND OF THE INVENTION

1. Field of the Invention

The present invention relates to a process for making polyalkyldiallylamine-epihalohydrin resins, the resultant resins, and their uses as wet strength additives for papermaking.

2. Description of Background and Other Information

Polyamidoamine-epichlorohydrin resins (PAE resins), polyalkylenepolyamine-epichlorohydrin resins (PAPAE resins), amine polymer-epichlorohydrin resins, polyurylene-epichlorohydrin resins, polyamide-polyurylene-epichlorohydrin resins, and combinations of these resins with anionic polymers such as carboxymethyl cellulose (CMC), have been widely used in the manufacture of paper having high levels of wet strength.

Polyamine-epihalohydrin resins are cationic thermosetting materials widely used to increase the wet strength of papers, however these materials often contain large quantities of epihalohydrin hydrolysis products. For example, commercial polyaminopolyamide-epichlorohydrin resins typically contain 1–10wt % (dry basis) of the epichlorohydrin (epi) by-products, 1,3-dichloropropanol (1,3-DCP), 2,3-dichloropropanol (2,3-DCP) and 3-chloropropanediol (CPD). There has been a movement within the industry to produce wet-strength resins having lower levels of adsorbable organic halogen (AOX) species, including, epichlorohydrin and epichlorohydrin by-products such as 1,3-dichloropropanol, 2,3-dichloropropanol and 3-chloropropanediol as well as an organic halogen bound to the polymer backbone. When residual alkyldiallylamine monomers are present during the reaction of an ADAA polymer with epichlorohydrin, the reaction product of epichlorohydrin with ADAA monomer produces an organohalogen compound that will be an AOX contributor. Thus, even when using the hydrohalide salt of a polyalkyldiallylamine (pADAA) to prepare pADAA-epichlorohydrin resins, there is still a need in the industry to reduce the residual epihalohydrin hydrolysis products to the lowest attainable level.

Among the epihalohydrin-containing resins, the tertiary amine-based epoxide resins provide the highest resin efficiency (which generally refers to the amount of wet strength developed per unit mass added to the paper or that overall higher levels of wet strength result regardless of how much resin is added) as well as the highest off-machine wet strength (the ability to provide wet strength to a sheet of paper without aging). This is in contrast to most other wet strength resins which show an improvement in wet strength after aging for several days. The tertiary amine-based epoxide resins give high levels of wet strength as made, which doesn't change much with time. Of the various types of tertiary amine-based epoxide resins that have been described, the polymethyldiallylamine-epichlorohydrin resins are the most effective wet strength additives known for paper on a weight basis. A number of these resins have been previously described, as set forth below. Although these resins are quite effective in imparting wet strength to paper, there is still a need for additives that (1) provide a high level of wet strength in paper, (2) have low levels of residual epichlorohydrin hydrolysis products in the resin and in paper products made using these resins and (3) are resins having lower levels of adsorbable organic halogens (AOX).

Polyalkyldiallylamine-epichlorohydrin resins and variants thereof have been disclosed in a number of U.S. patents, for example, U.S. Pat. No. 3,686,151 (Keim); U.S. Pat. No. 3,700,623 (Keim); U.S. Pat. No. 3,772,076 (Keim); U.S. Pat. No. 3,833,531, (Keim); U.S. Pat. No. 4,222,921 (Van Eenam); U.S. Pat. No. 4,233,417 (Van Eenam); U.S. Pat. No. 4,298,639 (Van Eenam); U.S. Pat. No. 4,340,692 (Van Eenam); U.S. Pat. No. 6,111,032 (Bower); and U.S. Pat. No. 6,268,452 (Kato et al.).

In addition, the use of polyamidoamine-epihalohydrin resins and other types of polyamine-epihalohydrin resins as wet strength agents is well known, wherein much of the discussion centers around reducing the levels of epihalohydrin hydrolysis products in these resins, for example, as described in U.S. Pat. No. 5,171,795 (Miller et al.) and U.S. Pat. No. 5,017,642 (Hasegawa et al.).

Post-synthesis treatments of resins to reduce the levels of hydrolysis products or halogenated by-products has also been described, for example as set forth in U.S. Pat. No. 5,256,727 (Dulaney et al.), U.S. Pat. No. 5,516,885 (Gorzynski et al.) and WO 92/22601.

The present invention provides for the preparation of polyalkyldiallylamine-epihalohydrin resins from the hydrohalide salt form of the alkyldiallylamine polymer. These hydrohalide salt-based resins are advantageous because such resins show superior performance as wet strength additives in paper when compared to the performance of resins prepared using other acid salts of the alkyldiallylamine polymer.

Another advantage in using the hydrohalide salt of the alkyldiallylamine polymer, specifically, the hydrochloride salt of polymethyldiallylamine, is that such resins are approved by the Food and Drug Administration (FDA) in the United States as a paper additive suitable for use in food contact applications (21 CFR Ch. I; 176.170).

In addition, the papermaking process releases epihalohydrin hydrolysis products into the environment, wherein the hydrolysis products can be found in the water that was used to make the paper, and/or in the air due to evaporation that occurs when the paper is dried. The hydrolysis products can also be found in the paper itself. Thus, the present invention addresses a need in the industry to reduce the levels of hydrolysis products found in paper, thereby helping to reduce and control these emissions in the environment to as low a level as possible.

SUMMARY OF THE INVENTION

The present invention generally relates to a process for making polyalkyldiallylamine-epihalohydrin resins, the resultant resins, and their uses as wet strength additives for papermaking.

More specifically, the present invention relates to a process for obtaining polyalkyldiallylamine-epihalohydrin resins comprising the steps of:

(a) forming a polyalkyldiallylamine polymer (pADAA) by the free radical polymerization or copolymerization in a first aqueous solution containing an alkyldiallylamine (ADAA) monomer in its protonated form in such a manner to yield a polymer having a very low level of residual ADAA monomers and a molecular weight in a specified range, based on a reduced specific viscosity of less than or equal to about 0.20 dL/g; and (b) reacting the pADAA polymer or copolymer with an epihalohydrin in a second aqueous solution under carefully controlled conditions of time, temperature, concentration, pH and ratio of epihalohydrin to amine functionality in the ADAA polymer.

The present invention further relates to the resins that are the reaction products of the above-described process.

Still further, the present invention relates to a cellulose matrix, preferably paper, comprising the resins of the present invention.

DETAILED DESCRIPTION OF THE INVENTION

The present invention relates to a process for making polyalkyldiallylamine-epihalohydrin resins, and the resultant resins, wherein the process comprises the steps of:

(a) forming a polyalkyldiallylamine polymer (pADAA) by the free-radical polymerization or copolymerization in a first aqueous solution containing a hydrohalide salt of an alkyldiallylamine (ADAA) monomer, said pADAA polymer having a reduced specific viscosity (RSV) of less than or equal to about 0.20 dL/g and a residual ADAA monomer content of less than or equal to about 2.0%; and (b) reacting the pADAA polymer or copolymer with an epihalohydrin in a second aqueous solution, wherein the ratio of epihalohydrin to pADAA amine functionality is from about 0.90 to 1.10, comprising the steps of:

(i) mixing an epihalohydrin and the pADAA at a total solids content of about 10 to 30% and a temperature of about 25 to 45° C., resulting in a reaction mixture;

(ii) simultaneously with step (i), adding an aqueous alkaline solution to the reaction mixture to maintain a pH between about 8.0 and 9.0 over a time period of about 4 to 14 hours;

(iii) adjusting the pH of the reaction mixture to about 1.0 to 3.0 with a mineral acid;

(iv) heating the reaction mixture to between about 70 to 90° C. for about 0.5 to 3.0 hours; and (v) simultaneously with step (iv), maintaining the pH of the reaction mixture at 1.0 to 3.0 by the addition of mineral acid.

The first step of the process of the present invention is the synthesis of the pADAA polymer utilizing a free radical polymerization or copolymerization process, which are well known to those skilled in the art, as generally described in G. Odian, *Principles of Polymerization, Second Edition*, Chapter 3, John Wiley & Sons, New York (1981) and/or free radical cyclopolymerization as described in G. B. Butler, *Cyclopolymerization and Cyclocopolymerization*, Marcel Dekker, New York (1992).

The free radical polymerization of the pADAA polymer results in the formation of a cyclized polymer backbone, referred to as a "cyclopolymerization". The cyclic backbone structure can be a 5- or 6-membered ring, or a mixture thereof. These structures are shown below and denoted as "Polymer (A)",

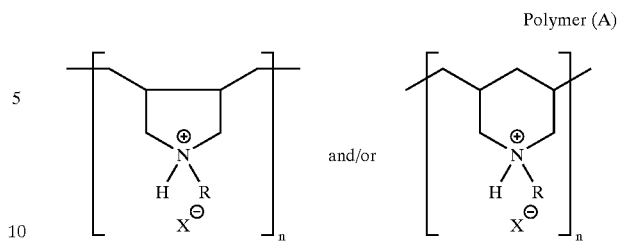

wherein n may be determined using size exclusion chromatography. The number of repeating units may also be determined via dividing the number average molecular weight of the polymer by the formula weight of the repeating unit such that in general, n is about 5 to 75. Preferably, however, n is about 5 to 50, and more preferably about 5 to about 40, so long as the RSV is less than or equal to about 0.20 dL/g.

Typically, the 5-membered ring structure is the predominant repeat unit found in this type of polymer, however, no specific ring-type or ratio is required for the present invention. The relative amounts of the two structures will depend on a number of factors including the identity and size of the substituent —R, the reaction temperature, the reaction solids content, the specific free radical initiator used and the identity of the complexing acid (HX). The —R group may be an alkyl group, for example, methyl, ethyl, propyl, and butyl, wherein the alkyl group is small enough to maintain water solubility. The —R group may also be a hydroxyalkyl group or other type of substituted alkyl group.

The complexing acids suitable for use in the present invention are the hydrohalide acids such as, for example, hydrochloric, hydrobromic, hydroiodic acids, sulfuric acid, nitric acid, phosphoric acid, methanesulfonic acid, and para-toluenesulfonic acid.

In order to produce a resin, and ultimately paper made from this resin, containing reduced levels of epihalohydrin hydrolysis products, the current invention utilizes the hydrohalide salt of a pADAA prepared in an aqueous solution, having a very low level of residual monomer and also a molecular weight that falls in a specified range.

A relative measure of the molecular weight can be obtained by the reduced specific viscosity (RSV) of the polymer. The RSV is measured by capillary viscometry of a 2.0 weight percent solution of the polymer in 1.0N $NH_4Cl$ solution at 25° C. The desired RSV of the ADAA polymer is less than or equal to 0.20 dL/g, preferably between about 0.05 to 0.20 dL/g, more preferably between about 0.075 and 0.20 dL/g, most preferred between about 0.10 to about 0.20 dL/g. The use of a low molecular weight prepolymer having an RSV within the given range results in low levels of epihalohydrin hydrolysis byproducts.

Generally, the reduced specific viscosity is determined by a two-step method. First the flow time of a polymer solution (PFT) in a capillary viscometer is measured, wherein the polymer solution has a set concentration. Second, the flow time of the solvent (SFT) is measured. Thus, the polymer flow time minus the solvent flow time is divided by the solvent flow time ((PFT−SFT)/SFT=SV), thereby resulting in the specific viscosity. Subsequently, the specific viscosity is divided by the polymer concentration to yield the reduced specific viscosity.

Generally, the residual monomer content of the present invention is equal to or less than about 2.0%. The residual monomer content is typically measured by proton NMR (nuclear magnetic resonance) or carbon-13 NMR, however carbon-NMR is preferred. The presence of residual monomers during the epihalohydrin reaction will reduce the product's efficiency because the epihalohydrin will react with the residual monomers, but the resultant product will not contribute to wet strength performance. Moreover, the residual monomer and its reaction product with epihalohydrin can contribute to the levels of adsorbable organic halide (AOX).

The present invention avoids the use of organic solvents, which aids in the reduction of the volatile organic compounds (VOC) present in the product. A reduction in the VOC's is reduces air emissions and pollution.

Suitable ADAA monomers for this polymerization include N-methyldiallylamine (MDAA, methyldiallyalmine), N-ethyldiallyamine, N-n-propyldiallylamine, N-isopropyldiallylamine, N-butyldiallylamine, N-tert-butyldiallylamine, N-sec-butyldiallylamine, N-pentyldiallyamine, N-n-hexyldiallyamine, N-acetamidodiallylamine, N-cyanomethyldiallylamine, N-β-propionamidodiallylamine, and N-(2-hydroxyethyl)diallylamine and mixtures thereof. These monomers are polymerized in the form of hydrohalide salts, preferably as the hydrochlroide salt. The most preferred of these monomers is the hydrochloride salt of N-methyldiallylamine (MDAAHCl).

The ADAA monomer can also be copolymerized with monomers that are soluble in water. Preferably, the ADAA monomer can be copolymerized with vinyl monomers such as acrylamide, methacrylamide, acrylic acid, methacrylic acid, itaconic acid, alkyl(meth)acrylates such as methyl acrylate, methyl methacrylate (MMA), ethyl acrylate, ethyl methacrylate, propyla acyrlate, propyl methacrylate, BMH, butyl acrylate (BA), butyl methacrylate, hydroxyalkyl(meth) acrylates, hydroxyethyl acrylate (HEA), hydroxyethyl methacrylate, hydroxypropyl acrylate, hydroxypropyl methacrylate, hydroxybutyl methacrylate (HBMA), styrene, ethylene, glyceryl acrylate and glyceryl methacrylate, hydroxypropyl methacrylamide (HPMA) and mixtures thereof; more preferably, acrylamide, methacrylamide, acrylic acid, methacrylic acid, itaconic acid, and mixtures thereof, most preferably acrylamide and acrylic acid and mixtures thereof.

An alternative method of producing the pADAA polymer in the desired reduced specific viscosity range, when the initiator to monomer ratio is less than 3 mole %, is to use a chain transfer agent. The use of chain transfer agents and initiators are a well known techniques for preparing polymers with controlled molecular weights. In this respect, there are many factors that contribute to the control of molecular weight when performing a free radical polymerization. These include, but are not limited to, the initiator to monomer ratio, the monomer concentration, the polymerization temperature, the initiator type, the presence of dissolved oxygen in the polymerization medium, the use of sparging gases during the polymerization and the purity of these gases, and the use of chain transfer agents, the occurrence of chain transfer to monomer, solvent or other species present in the polymerization mixture. Those skilled in the art will recognize and understand the necessary ratios, concentrations, temperatures and the like for the use of chain transfer agents, which are also well known in the art.

The use and chemistry of chain transfer agents is generally described in G. Odian, *Principles of Polymerization, Second Edition,* Chapter 3,ppg. 233–8, John Wiley & Sons, New York (1981)

Examples of those chain transfer agents that are well known in the art include, but are not limited to, aliphatic hydrocarbons, aromatic hydrocarbons, aromatic hydrocarbons with aliphatic hydrocarbon substituents, alkyl mercaptans, alkyl halides, di-alkyl sulfides, di-alkyldisulfides, alkylamines, alkyl ethers, alcohols, ketones, and carboxylic acids. Some specific chain transfer agents include, but are not limited to, n-butyl mercaptan, carbon tetrachloride, carbon tetrabromide, di-n-butyl sulfide, di-n-butyl disulfide, triethylamine, butlyamine, n-butyl iodide and chloroform.

Another alternative method of preparing the pADAA polymer with the appropriate reduced specific viscosity range is to start with a high molecular weight ADAA polymer and reduce the molecular weight by means of shear energy or the use of ultrasound, each of which is well known to those skilled in the art.

The free radical polymerization of the hydrohalide salt of the ADAA monomer is performed in an aqueous solution with a total solids content of from about 30 to 50% (wt). The initiator used may be a redox couple or a single thermally activated initiator. In order to obtain a pADAA having a low level of residual monomer (high extent of conversion) and a molecular weight in the desired range, the use of a thermally activated initiator is preferred and should be used in the range of about 3 to 10 mole %, based on the total monomer concentration in the reaction system. More preferably, the initiator to monomer ratio should be 3.5% to 10% and most preferably it should be 4.0–10%. This reaction is conducted at a temperature of 60 to 95° C. in the presence of a small amount of chelator such as ethylenediamine tetraacetic acid sodium salt (sodium EDTA).

Suitable initiators for use with the present invention include, but are not limited to a redox couple or a single thermally activated initiator. More specifically, suitable initiators include, but are not limited to, ammonium persulfate, t-butyl hydroperoxide, 2,2'-azobis-(2-amidinopropane) dihydrochloride, 2,2'-azobis-(2-imidazol-2-yl-propane) dihydrochloride, 2,2'-azobis-(2-carbamoylpropane) dihydrate or 2,2'-azobis-(2-methoxycarbonylpropane). Other suitable initiators are: hydrogen peroxide, benzoyl peroxide, cumene hydroperoxide, methyl ethyl ketone peroxide, lauryl peroxide, t-butyl perbenzoate, di-t-butyl perphthalate, azobisisobutyronitrile, 2,2'-azobis-(2,4-dimethylvaleronitrile), 2-phenyl-azo-2,4-dimethyl-4-methoxyvaleronitrile, 2-cyano-2-propylazoformamide, azodiisobutyramide, dimethyl, diethyl or di-n-butyl azobismethylvalerate, t-butyl perneodecanoate, di-isononanoyl peroxide, t-amyl perpivalate, di-2-ethylhexyl peroxydicarbonate, dilauroyl peroxide, di-isotridecyl peroxydicarbonate, t-butyl peroxyisopropyl percarbonate and combinations or mixtures thereof.

While not being bound by theory, it is theorized that the combination of a low molecular weight pADAA starting material and the controlled pH range allows the polyamine-epihalohydrin reaction to proceed to a fuller extent and be completed in a reasonable amount of time than would otherwise be possible. When a higher molecular weight pADAA (one having an RSV of greater than 0.20 dL/g) is used in this reaction, the viscosity quickly increases and the reaction must be stopped in order to prevent gelation. This results in higher levels of epihalohydrin residuals in the product. If a lower molecular weight pADAA is used but the pH is not maintained in the range of about 8.0 to 9.0, the pH of the reaction drops after the single initial pH adjustment and the reaction slows considerably. Under these conditions the rate of reaction is too slow to produce a suitable resin in a reasonable time frame for commercial production.

The second step of the process of the present invention is the reaction of the pADAA with an epihalohydrin, preferably epichlorohydrin. This step of the process must be carried out under specific reaction conditions of concentration, temperature, time, pH and ratio of epihalohydrin to pADAA. These specific reaction conditions are required in order to produce resins that impart high levels of wet strength to paper and also to ensure that the manufacture of these resins takes place in a controlled manner and in a reasonable time frame for commercial production.

The ratio of epihalohydrin to pADAA amine utilized in the preparation of these resins is from about 0.90 to 1.10, based on the repeat unit molecular weight.

The mineral acids may include sulfuric acid, nitric acid, phosphoric acid, methane-sulfonic acid, hydrochloric acid and para-toluene sulfonic acid. A preferred mineral acid used is hydrochloric acid.

In steps (ii) and (v) the pH must be carefully controlled by the continuous addition of base during the reaction, rather than performing a one-time pH adjustment at the beginning of the reaction and allowing the pH to drift. During step (ii) of the resin synthesis, the pH must be maintained in the range of 8.0 to 9.0 by the addition of base in order to prepare a resin with the desired characteristics. If the pH is not maintained within this range the rate of reaction will be either too fast or too slow for a reasonable commercial production of these resins. For example, if the pH is adjusted higher than about 9.0 the reaction will proceed at a very fast rate and it may not be possible to control the buildup of the resin's viscosity. This can result in gelation of the resin, rendering it unusable. On the other hand, if the pH drops below about 8.0, the rate of reaction will be slowed considerably and the time to build the desired viscosity of the resin will be inordinately long. Such long reaction times are not suitable for commercial production of these resins (reaction times of greater than 24 hours).

The resulting polyADAA-epihalohydrin resins have significantly lower levels of residual epihalohydrin hydrolysis products, while still providing very good performance as wet strength additives for papermaking. The resins also have significantly lower levels of residual epihalohydrin hydrolysis products in paper products made using these resins as a wet strength additive. In addition, the improved resins contain significantly lower levels of adsorbable organohalogen (AOX) compounds (which includes contributions from residual monomers as well as epihalohydrin hydrolysis by-products). Generally, the present invention contemplates an amount of epihalohydrin and epihalohydrin hydrolysis by-product residuals of less than or equal to 2.0%, preferably less than 1%, based on the total concentration of epihalohydrin, 1,3-dihalopropanol (1,3-DHP), 2,3-dihalopropanol (2,3-DHP) and 3-halopropanediol (HPD).

EXAMPLES

The present invention is further defined in the following Examples, in which all parts and percentages are by weight, unless otherwise indicated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usage and conditions.

Example 1

Comparative Example

Synthesis of a polyMDAA·HCl-epichlorohydrin Resin Prepared from a pMDAA·HCl Polymer with an RSV Greater than 0.20 dL/g and a Single pH Adjustment During the Initial Resin Cook Step Part 1

Example 1

Synthesis of the Homopolymer of Methyldiallylamine·Hcl Having an RSV Greater than 0.20 dL/g A four-necked reaction flask was fitted with a glass stir shaft connected to an overhead stirrer, a pH probe, a thermocouple, an addition-funnel and a condenser. A Thermowatch® (manufactured by I-2-R, Instruments for Research and Industry Inc., Cheltenham, Pa.) was used to maintain the temperature throughout the reaction. After charging the reaction flask with 223 g of methyldiallylamine (MDAA, 98%), the reaction vessel was cooled with an ice bath. The ice bath was used to maintain the temperature below 25° C. Using an addition funnel, 189 g of 37% hydrochloric acid (HCl) was slowly added to the stirred reaction vessel. The rate of addition was adjusted in order to maintain the temperature of the reaction mixture below 25° C. Upon finishing the addition of hydrochloric acid the ice bath was removed and the reaction mixture was stirred at ambient temperature for one hour. At this point the reaction mixture was a clear light yellow solution. Into this solution of MDAA·HCl solution, 0.5 g of Versenex® 80 (40% aqueous solution of the tetrasodium salt of ethylenediamine tetraacetate, available from Dow Chemical Co., Midland Mich.) was added. A septum was inserted in place of the addition funnel and a sparge of high purity nitrogen gas was started through the reaction mixture. A bubbler was attached at the condenser. The stirrer was started at 500 rpm and an insulated heating mantle was placed on the reaction flask and the reaction mixture was heated to 80° C. The reaction mixture was sparged with high purity $N_2$ for 30 minutes. An aqueous initiator solution was prepared by dissolving 13.7 g of ammonium persulfate (APS) in 40 mL of deionized water followed by sparging of the APS solution with high purity $N_2$ for 30 minutes. While maintaining the $N_2$ sparge and heating the reaction to 80° C., the APS initiator solution was added to the reaction flask using a syringe pump at a rate of 0.028 (mL/min) for 30 minutes. The addition rate was then changed to 0.21 (mL/min). After 10 mL of APS solution had been added to the reaction 80 mL of DI water were added and the temperature of the reaction was maintained at 80° C. for 1 hour. The second addition of a 10 mL portion of APS solution was then performed and the reaction mixture was held at 80° C. for 1 hour. The remaining APS solution was added at this point. The reaction mixture was held at 80° C. for 1 hour after the last of the APS solution had been added. Heating was then discontinued and 320 mL of deionized water were added. Analysis of the final product solution by $^{13}C$ NMR showed that a MDAA monomer conversion of 100% had been achieved. The RSV of the resin was 0.440 dL/g. Total solids of the product was 41.0% and the pH was 2.5.

Example 1

Part 2

Synthesis of the pMDAA·HCl-epichlorohydrin Resin

A sample of the MDAAH Cl polymer of Part 1 weighing 73.17 g (PolyMDAA HCl at 41.0% total solids, undetectable monomer residual, the RSV of the resin was 0.440 dL/g) was charged to the reaction vessel. While maintaining a nitrogen atmosphere in the reaction vessel, 102.27 g of deionized water was added to the reactor while stirring at at 300 rpm. The pH of the solution was adjusted from the original value of 1.18 to 8.09 using 13.03 g of a 1 M NaOH solution. The reaction mixture was then heated to 25° C. from 21° C. 18.48 g epichlorohydrin was added over a period of 18 minutes. The reaction mixture was then heated to 30° C. and the Gardner-Holt viscosity and pH were monitored. The pH had increased to 8.30 after the temperature reached 30° C. After 104 minutes, the Gardner-Holt viscosity reached a value of "D" and the pH had dropped to 7.97. At this point 50 g of deionized water was added and the pH was adjusted from 8.01 to 2.04 with 1.43 g of concentrated HCl. The resin solution was then heated to 80° C. and additional concentrated HCl was delivered to the reaction mixture to maintain the pH at 2.0–2.2. The temperature was maintained at 80° C. for one hour and the pH was finally adjusted to 2.0 with concentrated HCl. A total of 5.91 g concentrated HCl was used to adjust the pH in this step.

This resin contained 7 ppm epichlorohydrin, 2.13% 1,3-DCP, 143 ppm 2,3-DCP and 2,448 ppm CPD. The total solid of the final product was 16.92%, final pH=1.96, Brookfield viscosity was 51.5 cPs, measured at 25° C.

Example 2

Synthesis of the Homopolymer of Methyldiallylamine·HCl Having an RSV Less than 0.20 dL/g A four-necked reaction flask was fitted with a glass stir shaft connected to an overhead stirrer, a pH probe, a thermocouple, an addition funnel and a condenser. A Thermowatch® (manufactured by I-2-R, Instruments for Research and Industry Inc., Cheltenham, Pa.) was used to maintain the temperature throughout the reaction. After charging the reaction flask with 109 g of methyldiallylamine (MDAA, 98%), the reaction vessel was cooled with an ice bath. Using an addition funnel, 97 g of 37% hydrochloric acid (HCl) was slowly added to the stirred reaction vessel. The rate of addition was adjusted in order to maintain the temperature of the reaction mixture below 25° C. Upon finishing the addition of hydrochloric acid the ice bath was removed and the reaction mixture was stirred at ambient temperature for one hour. At this point the reaction mixture was a clear light yellow solution. Into this solution of MDAA·HCl, 0.5 g of Versenex® 80 (40% aqueous solution of the tetrasodium salt of ethylenediamine tetraacetate, available from Dow Chemical Co., Midland Mich.) and 200 g of deionized (DI) water was added. A septum was inserted in place of the addition funnel and a sparge of high purity nitrogen gas was started through the reaction mixture. A bubbler was attached at the condenser. The stirrer was started at 500 rpm and an insulated heating mantle was placed on the reaction flask and the reaction mixture was heated to 80° C. The reaction mixture was sparged with high purity $N_2$ for 30 minutes. An aqueous initiator solution was prepared by dissolving 18 g of ammonium persulfate (APS) in 30 mL of DI water followed by sparging of the APS solution with high purity $N_2$ for 30 minutes. While maintaining the $N_2$ sparge and heating the reaction at 80° C., the APS initiator solution was added to the reaction flask using a syringe pump at a rate of 0.30 mL/min. until 10 mL of initiator solution had been added. The reaction temperature was maintained at 80° C. while stirring at 500 rpm for one hour. A second 10 mL portion of initiator solution was then added at 0.30 mL/min. and the reaction mixture was held at 80° C. for one hour after adding this 10 mL portion. The remaining initiator solution was then added at a rate of 0.30 mL/min. When all the initiator solution had been added the reaction mixture was maintained at 80° C. for one additional hour. Heating was then discontinued and 320 mL of deionized water were added. Analysis of the final product solution by $^{13}C$ NMR showed that a MDAA monomer conversion of 99+% had been achieved. The RSV of the resin was 0.106 dL/g. Total solids of the product was 37.3% and the pH was 2.5.

Example 3

Comparative Example

Synthesis of polyMDAA·HCl-epichlorohydrin Resin Prepared from MDAA·HCl Polymer Having RSV Less than 0.20 dL/g and a Single pH Adjustment During the Initial Resin Cook Step

Part 1

Synthesis of the Homopolymer of Methyldiallylamine·HCl having an RSV of Less than 0.20 dL/g A four-necked reaction flask was fitted with a glass stirring shaft connected to an overhead stirrer, a pH probe, a thermocouple, an additional funnel and a condenser. A Thermowatch® (manufactured by I-2-R, Instruments for Research and Industry Inc., Cheltenham, Pa.) was used to maintain the temperature throughout the reaction. The reaction flask was charged with 223 g of methyldiallylamine (MDAA, 98%, 2.0 moles). While cooling the reaction kettle with an ice bath, 189 g of 37% hydrochloric acid (HCl) was gradually added to the reactor through the addition funnel while stirring. The temperature of the reaction mixture was maintained below 25° C. Upon finishing the addition of hydrochloric acid, the ice bath was removed and the reaction mixture was stirred at ambient temperature for one hour, at which time the reaction mixture turned into a clear light yellow solution. Into this monomer amine salt solution, 0.5 g of Versenex® 80 (40% aqueous solution of the tetrasodium salt of ethylenediamine tetraacetate, available from Dow Chemical Co., Midland Mich.) and 200 g of deionized water were added. The pH probe was replaced with a $N_2$ sparge, the addition funnel was replaced with a septum and a bubbler was attached to the condenser. An insulated heating mantle was then placed on the reaction flask. The stirrer was started at an agitation rate of 500 rpm and the heating temperature was set to 80° C. The reaction mixture was sparged with high purity $N_2$ for 30 minutes. Meanwhile, an initiator solution of 18.2 g of ammonium persulfate (APS) dissolved in 40 mL of DI water was prepared. The APS solution was sparged with high purity $N_2$ for 30 minutes. While maintaining the $N_2$ sparge and heating, the APS solution was introduced into the reaction flask at a rate of 0.3 mL/min using a syringe pump. When 15 mL of the APS solution had been added to the reactor, the addition of APS solution was discontinued and the temperature was maintained at 80° C. for one hour. At the end of this one hour heating period, a second addition of 15 mL of APS solution was commenced at a rate of 0.3 mL/min using a syringe pump. When this portion of APS had been added to the reactor, the APS addition was discontinued and the reaction mixture was maintained at 80° C. for one hour. At this point the remaining 20 mL of APS solution was added to the reactor at a rate of 0.3 mL/min using a syringe pump. When this final portion of APS solution had been added the reaction mixture was maintained at 80° C. for one hour before turning off the heat. Analysis of the final product solution by $^{13}$C NMR showed that a MDAA monomer conversion of 99+% had been achieved. The RSV of the resin was 0.163 dL/g. Total solids of the final solution was 48.8% and the pH was 2.5.

Example 3

Part 2

Synthesis of pMDAA·HCl-epichlorohydrin Resin

A quantity of 61.47 g of pMDAA·HCl from Part 1 of this example was charged to the reaction vessel. Under a nitrogen blanket 114.05 g of deionized water was added to the reactor while stirring the mixture at 300 rpm. The pH of the solution was adjusted from 1.21 to 8.10 with 15.82 g of a 1.0M NaOH solution. The reaction mixture was then heated from 20° C. to 25° C. and 18.48 g of epichlorohydrin was added over a period of 17 minutes. The reaction was then heated to 30° C. and the Gardner-Holdt viscosity and pH were monitored. After raising the temperature to 30° C. the pH increased to 8.36. After 108 minutes the Gardner-Holdt viscosity was still less than an "A" (the lowest value on the Gardner-Holt viscosity scale) and the pH had dropped to 7.78. After 8 hours the Gardner-Holdt viscosity was still less than "A" and the pH had dropped further to 7.30. After stirring at 30° C. for an additional 7 hours the Gardner-Holdt viscosity was still less than an "A". The pH had dropped to 7.13. The run was then stopped and the reactor contents were drained from the reactor because there was no viscosity increase during the reaction with epichlorohydrin.

Example 4

Synthesis of polyMDAA·HCl-epichlorohydrin Resin Prepared from MDAA·HCl Polymer having RSV Less than 0.20 dL/g and having Undetectable Residual Monomer Levels, and with pH Control Throughout the Initial Resin Cook Step Example 4

Part 1

Synthesis of the Homopolymer of Methyldiallylamine·HCl having an RSV of Less than 0.20 dL/g and Complete Monomer Conversion A four-necked resin kettle was fitted with a glass stirring shaft connected to an overhead stirrer, a pH probe, a thermocouple, an addition funnel and a condenser. A Thermowatch® (manufactured by I-2-R, Instruments for Research and Industry Inc., Cheltenham, Pa.) was used to maintain the temperature throughout the reaction. A quantity of 223 g methyldiallylamine (MDAA, 98%) was charged to the reactor. The reactor was then cooled with an ice bath and 189 g of 37% hydrochloric acid (HCl) was added to the stirred reaction mixture at such a rate to maintain the temperature of the reaction mixture below 25° C. Upon finishing the addition of hydrochloric acid, the ice bath was removed and the reaction mixture was stirred at ambient temperature for one hour. At this point the reaction mixture was a clear light yellow solution. Into this solution of MDAA·HCl solution, 0.5 g of Versenex® 80 (40% aqueous solution of the sodium salt of ethylenediamine tetraacetate, available from Dow Chemical Co., Midland, Mich.) was added. A septum was inserted in place of the addition funnel and a sparge of high purity nitrogen gas was started through the reaction mixture. A bubbler was attached at the condenser. The stirrer was started at 500 rpm and an insulated heating mantle was placed on the reaction flask. The reaction mixture was heated to 80° C. and was sparged with high purity $N_2$ for 30 minutes. Meanwhile, an aqueous initiator solution was prepared by dissolving 18.2 g of ammonium persulfate (APS) in 40 (mL) of deionized water followed by sparging of the APS solution with high purity $N_2$ for 30 minutes. While maintaining the $N_2$ sparge and heating the reaction at 80° C. the APS initiator solution was added to the reaction flask using a syringe pump at a rate of 0.30 (mL/min) until 15 mL APS initiator solution had been added. At this point the addition of initiator solution was halted and the reaction mixture was maintained at 80° C. for one hour while continuing to stir at 500 rpm. A second portion of 15 mL of APS initiator solution was added to the reaction flask using a syringe pump at a rate of 0.30 (mL/min). When this addition was completed the addition of initiator solution was halted and the reaction mixture was maintained at 80° C. for one hour while continuing to stir at 500 rpm. The remaining 20 mL of APS solution was added at this point via syringe pump at a rate of 0.30 mL per minute. The reaction mixture was held at 80° C. for 1 hour after the last of the APS solution had been added. Heating was then discontinued and 320 mL of DI water were added. Analysis of the final product solution by $^{13}$C NMR showed that a MDAA monomer conversion of 99+% had been achieved. The RSV of the resin was 0.160 dL/g. Total solids of the final solution was 44.8% and pH was 2.5.

Example 4

Part 2

Synthesis of the pMDAA·HCl-epichlorohydrin Resin

A charge 65.84 g of pMDAA·HCl prepolymer (PolyMDAA-HCl at 44.8% total solids) to the reaction vessel. Under nitrogen, add 107.72 g of deionized water to the reactor, stir at 210 rpm. The pH of the solution was adjusted from 1.4 to 8.1 with 16.33 g of a 1.0M NaOH solution. A 18.48 g portion of epichlorohydrin was added to the reaction mixture all at once. The reaction was then heated to 30–34° C. and the Gardner-Holt viscosity and pH were monitored. The pH was maintained in the range of 8.1 to 8.5 by incremental additions of 1.0M NaOH solution. A total 48.5 g of a 1.0M NaOH were added over a period of 6 hrs. At Gardner viscosity "C" to "D", 20.0 g of deionized water was added and the pH was adjusted to 2.04 with 1.2 g concentrated HCl. The reaction mixture was heated to 80° C. for one hour and an additional 6.43 g of concentrated HCl was added to maintain the pH at 2.0–2.2. After the hour hold time at 80° C. the product was cooled to room temperature and the pH was finally adjusted to 2.06 with 0.2 g of concentrated HCl. The product was then removed from the reactor and bottled.

The resin contained 11 ppm epi, 0.853% 1,3-DCP, 20 ppm 2,3-DCP, 860 ppm CPD, with total combined epi residual= 0.942%. The total solid of the final product was 16.32%, final pH=2.06, Brookfield viscosity measured at 25° C. was 74.5 cp.

Example 5

Synthesis of pMDAA·HCl-epichlorohydrin Resin

This resin was prepared in the same manner as the resin synthesized in Example 4, Part 2, except that 1M NaOH was added continuously throughout the resin synthesis through an addition funnel in order to maintain the pH at about 8.4. The pH was initially adjusted from 1.40 to 8.09 using 15.96 g of 1M NaOH before heating to 30° C. During the reaction at 30° C., a total of 67.39 g of 1M NaOH was added over a period of 7 hours. The pH ranged from 8.17 to 8.62 over this period. Over this 7 hour period the Gardner Holt viscosity had increased from a value of "–A" to a value of "E". At this point 1.78 g of concentrated HCl were added to bring the pH to 2.06. The reaction mixture was then heated to 80° C. and concentrated HCl was added to maintain the pH at 2.0 to 2.2. A total of 6.45 g of concentrated HCl was added over a period of 65 minutes. The reaction mixture was then cooled to room temperature and a final pH adjustment was performed with 0.16 g of concentrated HCl to bring the final pH to 2.07 from 2.41. The product contained 28 ppm epichlorohydrin, 1.17% 1,3-DCP, 46 ppm 2,3-DCP and 1,320 ppm CPD. This material had a total solids content of 17.89% and had a Brookfield viscosity of 405.5 cPs.

Example 6

Synthesis of pMDAA·HCl-epichlorohydrin Resin

This resin was prepared in the same manner as the resin synthesized in Example 4, Part 2, except that 1M NaOH was added continuously throughout the resin synthesis through an addition funnel in order to maintain the pH between 8.6 and 8.7, the stirrer speed was 290 rpm and the heating history was changed. The pH was initially adjusted from 1.36 to 8.10 using 16.51 g of 1M NaOH before heating to 30° C. After heating at 30° C. for 190 minutes the viscosity had increased from a Gardner-Holt value of "–A" to "A". At this point heating was discontinued and an ice bath was used to cool the reaction to 7.4° C. The ice bath was removed and the temperature was allowed to equilibrate to ambient temperature (21.5° C.). After 287 minutes the Gardner-Holt viscosity had increased from a value of "A" to "F+". A total of 65.39 g of 1M NaOH was added during the reaction and the pH ranged from 8.61 to 8.86. At this point 1.40 g of concentrated HCl were added to bring the pH to 2.01. The reaction mixture was then heated to 80° C. and concentrated HCl was added to maintain the pH at 2.0 to 2.2. A total of 7.38 g of concentrated HCl was added over a period of 45 minutes. The reaction mixture was then cooled to room temperature and bottled. The product contained 12 ppm epichlorohydrin, 0.957% 1,3-DCP, 72 ppm 2,3-DCP and 1,400 ppm CPD. This material had a total solids content of 17.37%, a pH of 2.16 and had a Brookfield viscosity of 145.5 cPs.

Example 7

Synthesis of pMDAA·HCl-epichlorohydrin Resin

This resin was prepared in the same manner as the resin synthesized in Example 4, Part 2, except that the pH was controlled at about 8.1 by the addition of 1M NaOH while running the reaction at 25–30° C. and the stirrer speed was 230 rpm. The pH was initially adjusted from 1.37 to 8.12 using 16.36 g of 1M NaOH. After the epichlorohydrin addition was completed the temperature had risen to 29° C. The reaction was cooled with an ice bath intermittently to maintain the reaction temperature at 25° C. for two hours. At this point the reaction was heated to 30° C. for 2.5 hours and 1M NaOH was added slowly to the reaction to maintain the pH at about 8.1. The reaction was then held at 26° C. for an additional 1.25 hours. At this point the reaction mixture was refrigerated overnight. The next day the reaction mixture was heated from 1° C. to 28° C. while maintaining the pH at about 8.1 by the slow addition of a 1M NaOH solution. After 2.5 hours the Gardner-Holt viscosity had increased from a value of A– to B. The reaction temperature was then changed to 21° C. After 1.5 hours at 21° C. the Gardner-Holt viscosity reached a value of D+/E– and 10 g water were added to the reaction. Thirty minutes later the Gardner-Holt viscosity had increased to G+/F– and an additional 10 g water were added. Ten minutes later the Gardner-Holt viscosity of the reaction mixture was at a level of G+/F–. A total of 50.61 g of 1M NaOH solution had been added to the reaction to maintain the pH in the range of 7.97 to 8.51. For most of the reaction the pH was in the range of 8.0 to 8.1. At this point heating was discontinued and 1.24 g of concentrated HCl were added to bring the pH to 2.01. The reaction mixture was then heated to 75–80° C. and concentrated HCl was added to maintain the pH at 2.0 to 2.2. A total of 5.82 g of concentrated HCl was added over a period of 100 minutes. The reaction mixture was then cooled to room temperature and bottled. The product contained 10 ppm epichlorohydrin, 1.10% 1,3-DCP, 75 ppm 2,3-DCP and 1,580 ppm CPD. This material had a total solids content of 16.93%, a pH of 2.02 and had a Brookfield viscosity of 442.5 cPs.

The properties of some example ADAA-epichlorohydrin resins are shown in Table 1 for comparison. The resins made with a lower RSV prepolymer and with continuous pH adjustment throughout the reaction have significantly reduced levels of epichlorohydrin byproducts present. As shown in Table 1, the present invention was able to significantly reduce the 1,3-DCP and CPD levels to about half of the levels found Example 1.

TABLE 1

Properties of pADAA-Epichlorohydrin Resins

| Example No. | Prepoly. RSV | Rxn. pH | Total Solids | Brookfield Viscosity (cPs) | Epichlorohydrin and Byproducts | | | |
|---|---|---|---|---|---|---|---|---|
| | | | | | Epi. | 1,3-DCP | 2,3-DCP | CPD |
| 1 | 0.440 | 8.09–7.97 | 16.92% | 51.5 | 7 ppm | 2.13% | 123 ppm | 2,448 ppm |
| 4 | 0.160 | 8.10–8.50 | 16.32% | 74.5 | 11 ppm | 0.853% | 20 ppm | 860 ppm |
| 5 | 0.160 | 8.17–8.62 | 17.89% | 405.5 | 28 ppm | 1.17% | 46 ppm | 1,320 ppm |

TABLE 1-continued

Properties of pADAA-Epichlorohydrin Resins

| Example No. | Prepoly. RSV | Rxn. pH | Total Solids | Brookfield Viscosity (cPs) | Epichlorohydrin and Byproducts | | | |
|---|---|---|---|---|---|---|---|---|
| | | | | | Epi. | 1,3-DCP | 2,3-DCP | CPD |
| 6 | 0.160 | 8.61–8.86 | 17.37% | 145.5 | 12 ppm | 0.957% | 72 ppm | 1,400 ppm |
| 7 | 0.160 | 7.97–8.51 | 16.93% | 442.5 | 10 ppm | 1.10% | 75 ppm | 2,070 ppm |

Example 8

Handsheet Evaluations

Paper handsheets were prepared on a handsheet machine (manufactured by Noble and Wood Machine Company, Hoosick Falls N.Y.) at pH 7.5 using a 50:50 blend of Rayonier bleached softwood Kraft pulp (available from Rayonier Inc. Jacksonville Fla.), and Crown Vantage bleached hardwood Kraft dry lap pulp (available from Crown Vantage Inc., Cincinnati Ohio) refined to 500 mL Canadian Standard Freeness. Sheets were generated having a 40 lb/3000 sq. ft. basis weight containing 1.0% of treated resin (based on the solids of untreated resin). Handsheets were wet pressed to 33% solids and dried on a drum drier at 230° C. for 55 seconds to give 3–5% moisture. All of the handsheets were oven-cured at 80° C. for 30 minutes prior to testing. The paper was conditioned according to TAPPI Method T-402 and tested. Some of the paper was natural aged by conditioning at greater than two weeks at 50% relative humidity and at 23° C. and then tested. Dry tensile strength was determined using TAPPI Method T-494. Wet tensile strength was determined using TAPPI Method T-456 with a two hour soak time. The results are shown below in Table 2.

For comparative purposes some paper was prepared with no strength additives included (blank), while other paper was prepared using commercial wet strength additives. The commercial wet strength additive used was Kymene® 2064, a poly(methyldiallylamine hydrochloride)-epichlorohydrin resin made with an MDAA polymer having an RSV greater than 0.20 dL/g and no pH adjustment during the epi reaction (supplied by Hercules Incorporated, Wilmington Del.). The PMDAA-epichlorohydrin resins were activated by base addition. Kymene® 2064 and the Example 3 resin were activated with caustic prior to making handsheets with them. The activation was performed as follows: A sample of 1.08 g resin solids was combined with 17.5 g deionized water and 5.0 g of 1.0M NaOH (4.0 wt. %) and was mixed for 15 minutes prior to use. Results of the handsheet testing are shown in Table 2.

TABLE 2

Properties of Handsheets Made With Strength Additives

| Strength Additive | Basis Wt. (#/3000 ft²) | Dry Tensile (#/in.) | Wet Tensile (#/in.) | CPD in Paper | DCP in Paper |
|---|---|---|---|---|---|
| None (blank) | 40.2 | 19.8 | 0.59 | N/D | N/D |
| 1% Kymene® 2064 | 40.3 | 20.1 | 3.02 | 62 ppb | 120 ppb |
| 1% Example 4 | 40.9 | 23.3 | 7.45 | 37 ppb | <3 ppb |

It is seen that by using a pADAA according to the present invention with an RSV of less than 0.20 dL/g and controlling the pH between 8.1 and 8.5 one can produce a resin having significantly lower epichlorohydrin residuals and byproducts and greatly improved wet strength properties in paper. The levels of epichlorohydrin byproducts in the paper was also substantially reduced.

Example 9

Handsheet Evaluations

Another set of paper handsheets were prepared to measure the effects of the resins on wet and dry tensile properties of paper. The handsheet preparation procedure was the same as that used in Example 8. Test results for these handsheets are listed in Table 3. Kymene® 557H (supplied by Hercules Incorporated, Wilmington, Del.) is a polyamidoamine-epichlorohydrin wet strength resin that is an azetidinium-functional PAE.

TABLE 3

Properties of Handsheets Made With Strength Additives

| Strength Additive | Basis Wt. (#/3000 ft²) | Dry Tensile (#/in.) | Wet Tensile (#/in.) |
|---|---|---|---|
| None (blank) | 38.0 | 17.0 | 0.53 |
| 1% Kymene® 557H | 40.0 | 21.7 | 5.69 |
| 1% Example 1 (Comparative) | 38.5 | 22.5 | 4.94 |
| 1% Example 4 | 40.9 | 25.2 | 6.93 |
| 1% Example 7 | 40.0 | 25.2 | 6.57 |

The wet and dry tensile properties of the resins of the invention (Examples 4 and 7) are much better than those of Kymene 557H or of a pMDAA-epichlorohydrin resin made with a prepolymer having an RSV of >0.20 dL/g and with a single pH adjustment during the reaction with epichlorohydrin (Example 1).

Example 10

Handsheet Evaluations

An additional set of paper handsheets were prepared to measure the effects of the resins on wet and dry tensile properties of paper. The handsheet preparation procedure was the same as that used in Example 8. Test results for these handsheets are listed in Table 4.

TABLE 4

Properties of Handsheets Made With Strength Additives

| Strength Additive | Basis Wt. (#/3000 ft²) | Dry Tensile (#/in.) | Wet Tensile (#/in.) |
|---|---|---|---|
| None (blank) | 40.0 | 18.8 | 0.58 |
| 1% Kymene ® 557H | 39.7 | 23.8 | 6.36 |
| 1% Example 4 | 40.9 | 23.3 | 7.49 |
| 1% Example 5 | 39.2 | 26.7 | 7.78 |
| 1% Example 6 | 39.8 | 25.3 | 7.31 |
| 1% Example 7 | 39.4 | 25.6 | 7.45 |

What is claimed is:

1. A process for forming a polyalkyldiallylamine-epihalohydrin resin comprising the steps of:
   (a) forming an alkyldiallylamine polymer by the free-radical polymerization or copolymerization in a first aqueous solution of a hydrohalide salt of an alkyldiallylamine monomer, said alkyldiallylamine polymer having a reduced specific viscosity less than or equal to about 0.20 dL/g and a residual alkyldiallylamine monomer content of less than about 2.0%; and
   (b) reacting the alkyldiallylamine polymer with an epihalohydrin in a second aqueous solution, wherein the ratio of epihalohydrin to alkyldiallylamine polymer amine functionality is from about 0.90 to about 1.10, comprising the steps of:
      (i) mixing an epihalohydrin and the alkyldiallylamine polymer at a total solids content of about 10 to 30% and a temperature of about 25 to 45° C., resulting in a reaction mixture;
      (ii) simultaneously with step (i), adding an aqueous alkaline solution to the reaction mixture to maintain a pH between about 8.0 and 9.0 over a time period of about 4 to 14 hours;
      (iii) adjusting the pH of the reaction mixture to 1.0 to 3.0 with a mineral acid;
      (iv) heating the reaction mixture to between 70 to 90° C. for about 0.5 to 3.0 hours; and
      (v) simultaneously with step (iv), maintaining the pH of the reaction mixture at 1.0 to 3.0 by the addition of mineral acid.

2. The process according to claim 1, wherein the alkyldiallylamine monomer is selected from the group consisting of N-methyldiallylamine, N-ethyldiallyamine, N-n-propyldiallylamine, N-isopropyldiallylamine, N-butyldiallylamine, N-tert-butyldiallylamine, N-sec-butyldiallylamine, N-pentyldiallyamine, N-n-hexyldiallyamine, N-acetamidodiallylamine, N-cyanomethyldiallylamine, N-β-propionamido-diallylamine, N-(2-hydroxyethyl)diallylamine and mixtures thereof.

3. The process according to claim 1, wherein the hydrohalide salt of the alkyldiallylamine monomer is a hydrochloride salt.

4. The process according to claim 3, wherein the alkyldiallylamine monomer is the hydrochloride salt of N-methyldiallylamine.

5. The process according to claim 1, wherein the reduced specific viscosity of the alkyldiallylamine polymer is between about 0.05 dL/g and about 0.20 dL/g.

6. The process according to claim 5, wherein the reduced specific viscosity of the alkyldiallylamine polymer is between about 0.10 dL/g and about 0.20 dL/g.

7. The process according to claim 1, wherein the residual alkyldiallylamine monomer content is less than about 1.0%.

8. The process according to claim 1, wherein the alkyldiallylamine polymer is a copolymer of the alkyldiallylamine monomer and a vinyl monomer.

9. The process according to claim 8, wherein the vinyl monomer is an acrylamide, methacrylamide, acrylic acid, methacrylic acid, itaconic acid or mixtures thereof.

10. The process according to claim 1, wherein the epihalohydrin is epichlorohydrin.

11. A resin comprising the reaction product of the process according to claim 1.

12. A cellulose matrix comprising the resin of claim 11.

* * * * *